(12) United States Patent
Soumi

(10) Patent No.: US 7,631,399 B2
(45) Date of Patent: Dec. 15, 2009

(54) CABLE HOLDER

(75) Inventor: Mitsuo Soumi, Saitama (JP)

(73) Assignee: FUJIFILM corporation, Tokyo (JP)

( * ) Notice: Subject to any disclaimer, the term of this patent is extended or adjusted under 35 U.S.C. 154(b) by 477 days.

(21) Appl. No.: 11/220,691

(22) Filed: Sep. 8, 2005

(65) Prior Publication Data

US 2006/0048346 A1 Mar. 9, 2006

(30) Foreign Application Priority Data

Sep. 8, 2004 (JP) ............................. 2004-261553
Mar. 2, 2005 (JP) ............................. 2005-056933

(51) Int. Cl.
*F16G 11/00* (2006.01)
(52) U.S. Cl. .................. 24/115 R; 24/316; 24/129 R; 24/115 K; 24/458
(58) Field of Classification Search ............ 24/30–315, 24/318–321, 115 H, 115 K, 115 R, 129 A, 24/129 B, 129 D, 129 R, 316, 458, 115 A; 224/908, 909, 929; 396/423, 535
See application file for complete search history.

(56) References Cited

U.S. PATENT DOCUMENTS

| | | | | | |
|---|---|---|---|---|---|
| 317,415 | A | * | 5/1885 | Pollock | 24/318 |
| 536,390 | A | * | 3/1895 | Parker | 24/318 |
| 577,080 | A | * | 2/1897 | Solt | 24/318 |
| 2,079,981 | A | * | 5/1937 | Bednall | 24/313 |
| 2,157,037 | A | * | 5/1939 | Troendly | 24/321 |
| 2,229,003 | A | * | 1/1941 | Fly | 24/200 |
| 2,269,696 | A | * | 1/1942 | Shaulson | 24/200 |
| 2,276,595 | A | * | 3/1942 | Shaulson | 24/200 |
| 2,278,153 | A | * | 3/1942 | Shaulson | 24/200 |
| 3,326,430 | A | * | 6/1967 | Banks | 224/908 |
| 3,870,209 | A | * | 3/1975 | Mazur | 224/908 |
| 4,370,040 | A | * | 1/1983 | Lange | 396/535 |
| 4,941,434 | A | * | 7/1990 | Ellwanger | 119/771 |
| 5,065,919 | A | * | 11/1991 | Sims | 224/909 |
| 5,307,967 | A | * | 5/1994 | Seals | 224/908 |
| 5,740,952 | A | * | 4/1998 | Huckenbeck | 224/271 |
| 6,134,388 | A | * | 10/2000 | Balling et al. | 396/6 |
| D445,723 | S | * | 7/2001 | Kim | D11/218 |
| 6,836,360 | B2 | * | 12/2004 | Steiner | 359/407 |
| 7,020,936 | B2 | * | 4/2006 | Tsai | 24/302 |

FOREIGN PATENT DOCUMENTS

| | | |
|---|---|---|
| JP | 11-326071 A | 11/1999 |
| JP | 2002-335620 A | 11/2002 |
| JP | 2003-36936 A | 2/2003 |

* cited by examiner

*Primary Examiner*—Robert J Sandy
(74) *Attorney, Agent, or Firm*—Sughrue Mion, PLLC

(57) ABSTRACT

A cable holder is provided with an attachment portion to be attached to a strap retainer of a portable device, and a holder plate portion having a plurality of supporting projections. The attachment portion is provided with at least one claw to engage with the strap retainer. The claw elastically deforms for attaching/detaching the cable holder. A cable hole for inserting the cable is formed between two contiguous supporting projections. The cable is threaded in the cable hole between the supporting projections. With friction between the supporting projections and the cable, the cable is prevented from being unplugged.

18 Claims, 12 Drawing Sheets

CABLE HOLDER

BACKGROUND OF THE INVENTION

1. Field of the Invention

The present invention relates to a cable holder adapted to a portable device.

2. Background Arts

An image recorded by a digital camera is displayed on a TV monitor or transferred to a machine such as a personal computer for editing or printing out. The digital camera is provided with a plurality of connectors for video outputting, data communicating, and power supply, and connected to the TV monitor, the personal computer, or a power source via a dedicated cable. If a communication cable or a power supply cable is pulled out in the middle of data transfer from the digital camera, it not only stops the data communication but also may cause damage to the image data and trouble of a memory. Accordingly, it is necessary to prevent the cables from being pulled out of the connectors accidentally.

Conventional cable stoppers (disclosed in, for example, Japanese Patent Laid-Open Publications Number 11-326071, 2002-335620, and 2003-36936) are known to prevent a consent plug from being disconnected even if pulling force is applied to the cable. Such a cable stopper is attached on a wall or a surface of a device with an outlet or a connecter thereon, for blocking the transmission of the pulling force from the cable to the consent plug at one end of the cable by nipping or engaging with the cable.

However, providing the portable device such as the digital camera with a conventional cable disconnection prevention structure (a plug disconnection prevention structure) enlarges the portable device, which results in losing compactness and portability of the portable device and adversely affecting an exterior design thereof.

SUMMARY OF THE INVENTION

An object of the present invention is to provide a cable holder capable of keeping a compactness of a portable device and not bothering a user when not used.

In order to achieve the above object and other objects, the cable holder of the present invention is provided with an attachment portion attachable to a strap retainer of the portable device, and a cable holding portion to be connected to the attachment portion via a connecting portion. The cable holding portion holds apart of a cable connected to the portable device.

The attachment portion has at least one claw for engaging with the strap retainer. The claw elastically deforms when engaging with the strap retainer. The attachment portion also has a strap hole for lacing a strap connected to a strap retainer through it.

The attachment portion, the cable holding portion, and the connecting portion are formed of plastic and molded integrally. The cable supporting portion is provided with an electric wave absorbing member.

In a preferable embodiment of the present invention, the connecting portion is a flexible arm portion, while the cable supporting portion is a holder plate portion in the form of a plate. The holder plate portion has a plurality of supporting projections arranged in line such that a cable hole is formed between each two contiguous supporting projections. The supporting projections are provided on one side or both sides of the holder plate portion.

In another preferable embodiment of the present invention, the cable supporting portion is a pair of sleeve halves to be displaced between an opening position and a closing position. The cable can be inserted between the sleeve halves when the sleeve halves are in the opening position, and it is supported when the sleeve halves are in the closing position.

Since the cable holder of the present invention is attached to the strap retainer that is for attaching a strap used to carry the portable device, it does not increase the size of the portable device. The cable holder does not bother a user when not used, as it can be easily removed from the portable device when, for example, the cable is not connected. In addition, the cable holder is in such an accessory form that it does not to adversely affect an exterior design of the portable device. Furthermore, the cable holder can be attached to the strap connected to the strap retainer.

The attachment portion is securely fixed by engaging the claw with the strap retainer. Since the arm portion is formed to curve, it interspaces between the cable supporting portion and the portable device so as to prevent the cable supporting portion from covering a plug-in of a connector on the portable device. When a pair of claws are individually connected to the cable supporting portion via a pair of arm portions, the claws can be easily attached to or detached from the strap retainer by pushing the arm portion.

In addition, since a plurality of supporting projections are provided to the cable supporting portion, it is possible to securely support the cable by preventing the cable from slipping off. The cable holder of the present invention can support even the cable having a large connection terminal, since only the cable is inserted into the space between the supporting projections. Furthermore, the supporting projection is formed to stretch in the width direction thereof at the end, and the cable is thus prevented from slipping off from the supporting projections.

When the cable supporting portion is constituted with two sleeve halves, it is possible to easily support the cable by nipping it between the sleeve halves.

Furthermore, since the electric wave absorbing member is provided to the cable holder, it is possible to prevent deterioration of video images and sounds caused by radiations of electromagnetic wave from the communication cable or power source cable mixed as noise into an analogue video signal or sound signal.

BRIEF DESCRIPTION OF THE DRAWINGS

One with ordinary skill in the art would easily understand the above-described objects and advantages of the present invention when the following detailed description is read with reference to the drawings attached hereto.

PREFERRED EMBODIMENTS OF THE INVENTION

Figure 1:
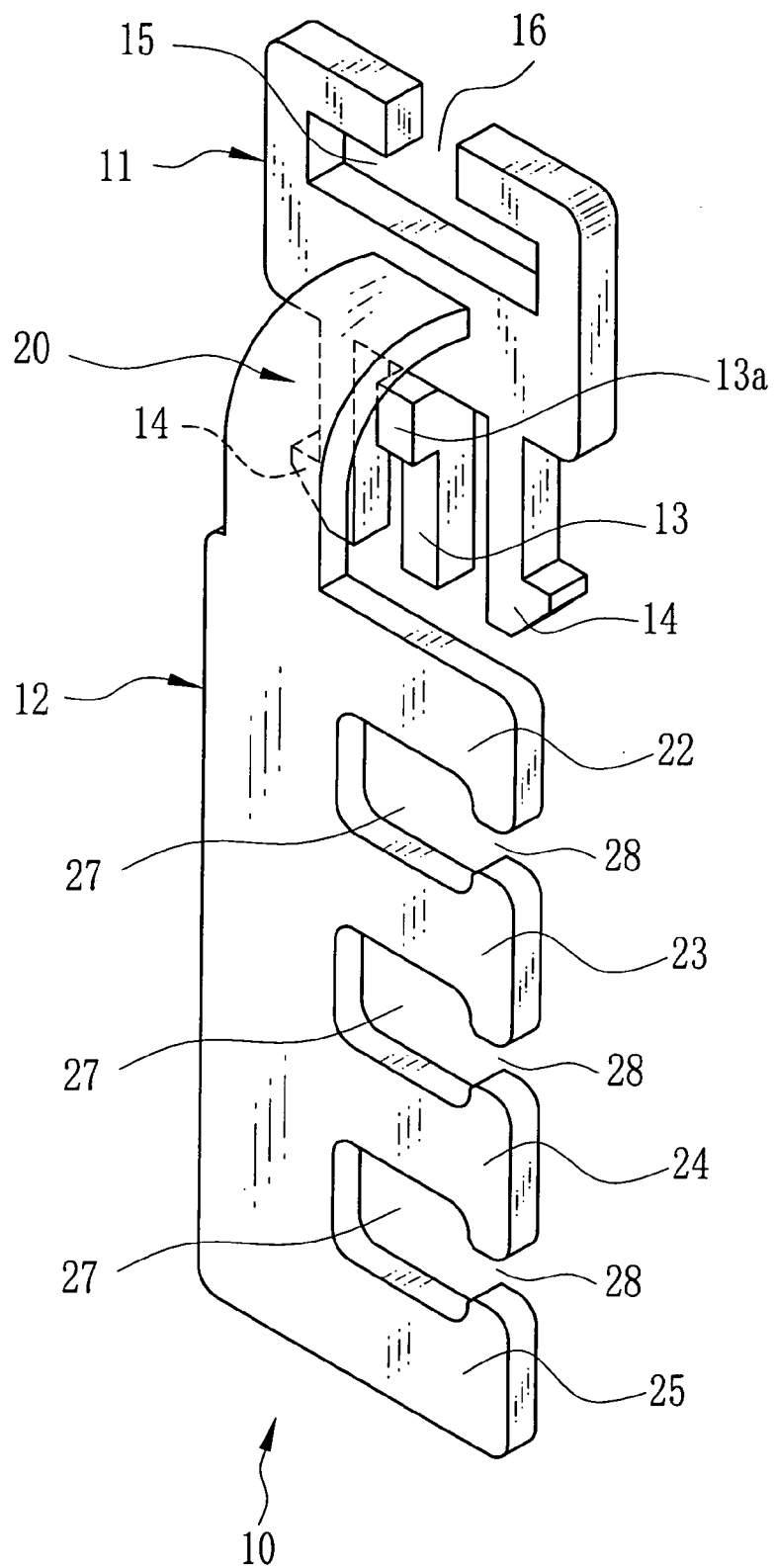
FIG. 1 is a perspective view of a cable holder of the present invention.

As shown in FIG. 1, a cable holder 10 comprises an attachment portion 11 to be attached to a portable device, a holder plate portion (a cable holder portion) 12, and an arm portion 20 connecting the holder plate portion 12 to the attachment portion 11. The attachment portion 11, the holder plate portion 12, and the arm portion 20 are integrally molded with plastic. A projection 13 and a pair of claws 14 are projected from the bottom of the attachment portion 11. The projection 13 has a function to prevent breakage of the claws 14 by dispersing a force applied on the claws 14 when an external force is applied to the attachment portion 11 in a direction bending it forward. The projection 13 is provided with a stopper 13a protruding vertically thereto.

The claws 14 are provided on both sides of the projection 13 and toes of them direct outsides. The claws 14 have plasticity and, when the attachment portion 11 is attached to or detached from the portable device, elastically deforms as bringing the toes closer to one another. The projection 13 contacts the claws 14 being elastically deformed, in order to protect the claws 14 not to reach the elastic limit and break. A strap hole 15 having a strap insert opening 16 is provided at the upper portion of the attachment portion 11.

The arm portion 20 is curved for keeping a predetermined space between the holder plate portion 12 and the attachment portion 11. The holder plate portion 12 is provided with four supporting projections 22, 23, 24 and 25 protruding from one of longitudinal sides thereof. Each end of the supporting projections 22 to 25 is stretched in the width direction thereof. The four supporting projections 22 to 25 forms three identical cable holes 27 therebetween. Each cable hole 27 has a narrow cable insert opening 28 that prevents the cable within the cable hole 27 from slipping off.

Figure 2:
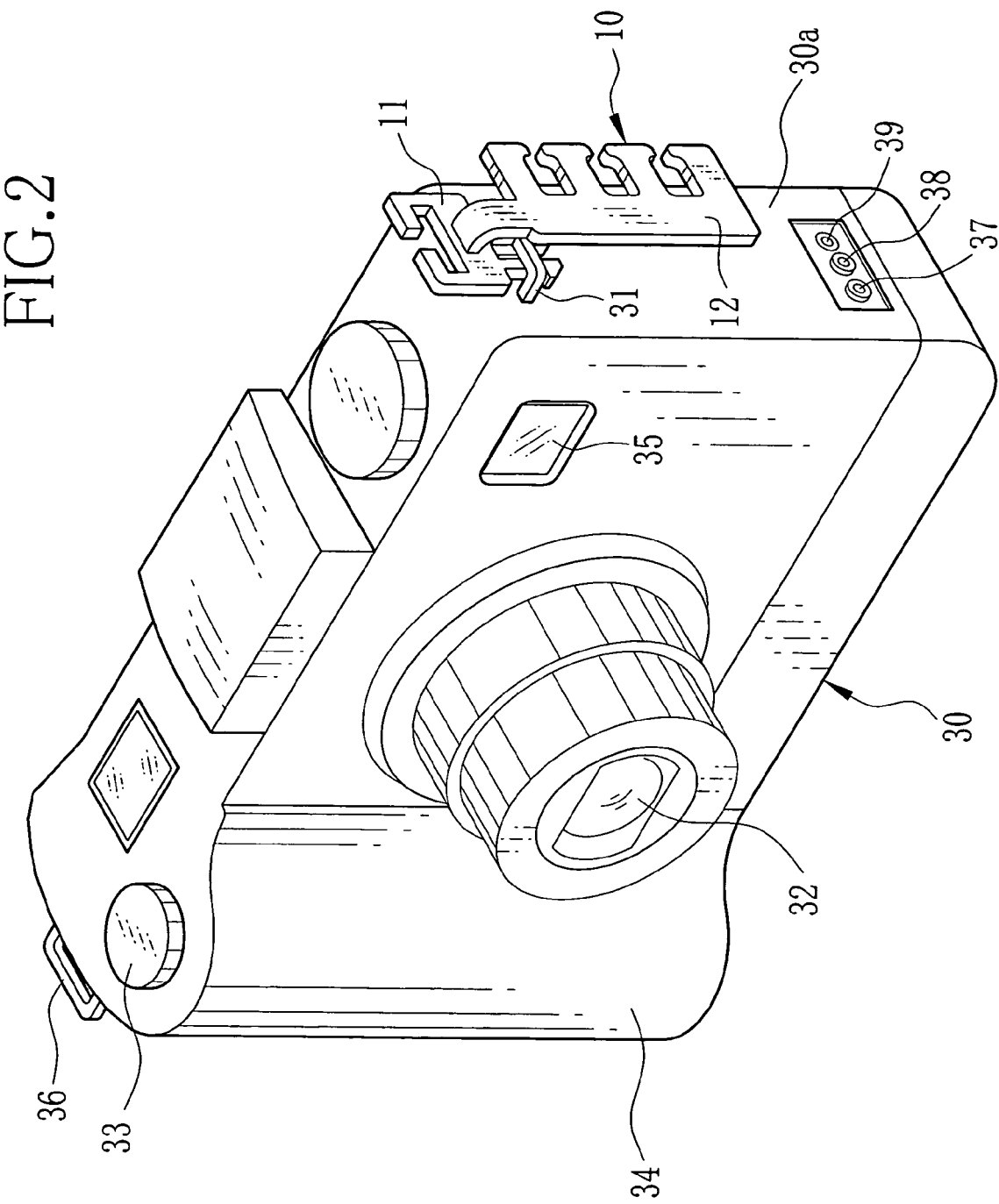
FIG. 2 is a perspective view of a digital camera with a cable holder attached to a strap retainer.

As shown in FIG. 2, a digital camera 30 is provided with a taking lens 32, a shutter release button 33, a gripping portion 34, and a finder 35. Strap retainers 31 and 36 are formed of metal and provided on the side faces of the digital camera 30. A strap inserted into both strap retainers 31 and 36 serves as a shoulder belt. The cable holder 10 is attached to the strap retainer 31 via the attachment portion 11.

Figure 3:
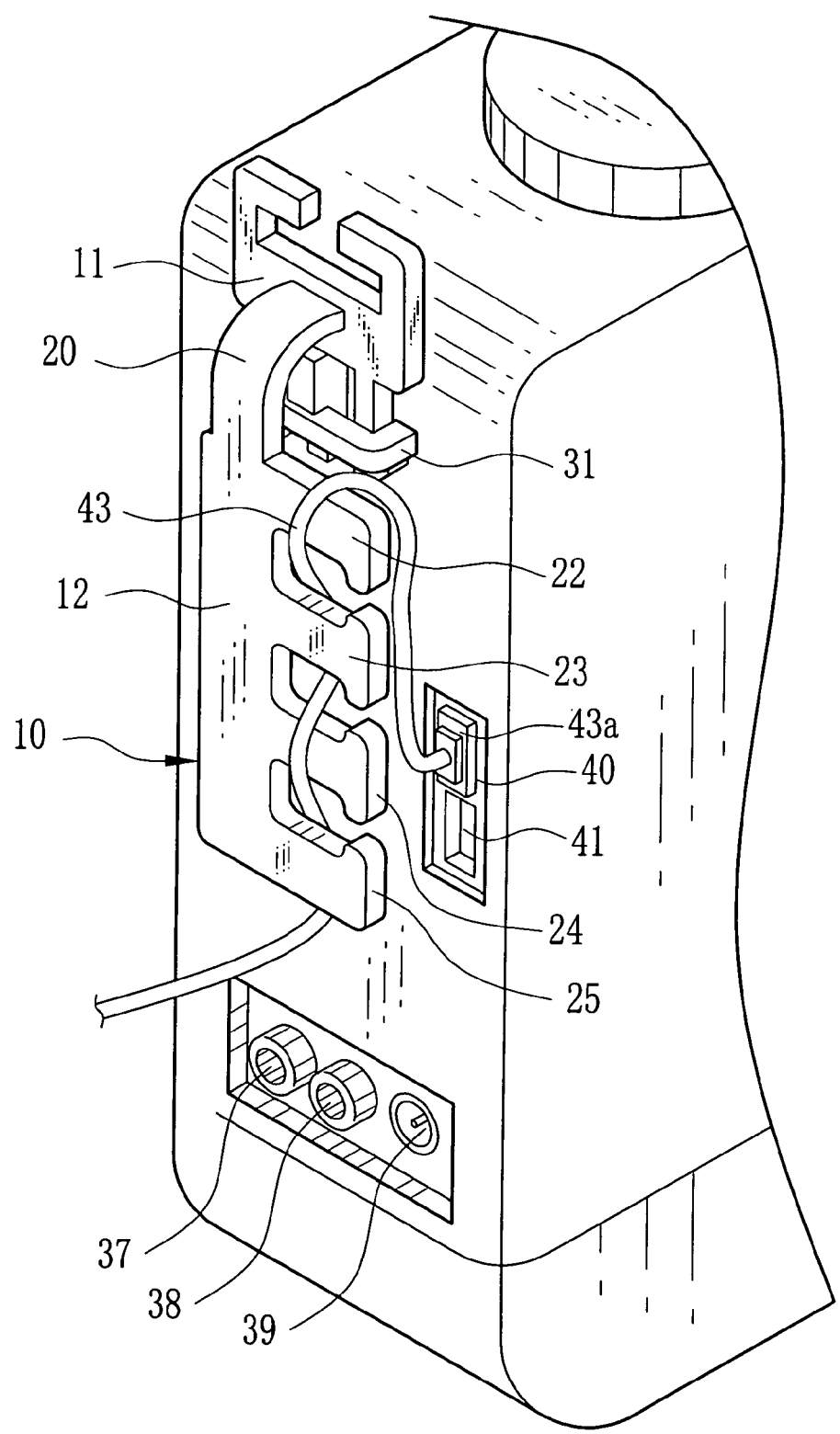
FIG. 3 is a magnified side view of the digital camera with the cable holder, supporting a cable, attached thereto.

As shown in FIG. 3, the side face 30a of the digital camera 30 is provided with a video output terminal 37, a sound output terminal 38, a power supply terminal 39, and data communication terminals 40 and 41. The cable holder 10 attached to the strap retainer 31 is positioned close to the terminals, so as to support the cables connected to the terminals with the holder plate portion 12. A communication cable 43 connected to the data communication terminal 40 via a connection terminal 43a is supported by the cable holder 10. The communication cable 43 is threaded through the cable holes 27 to rest on the front face of the supporting projection 22, the rear face of the supporting projection 23, the front face of the supporting projection 24, and the rear face of the supporting projection 25.

Figure 4:
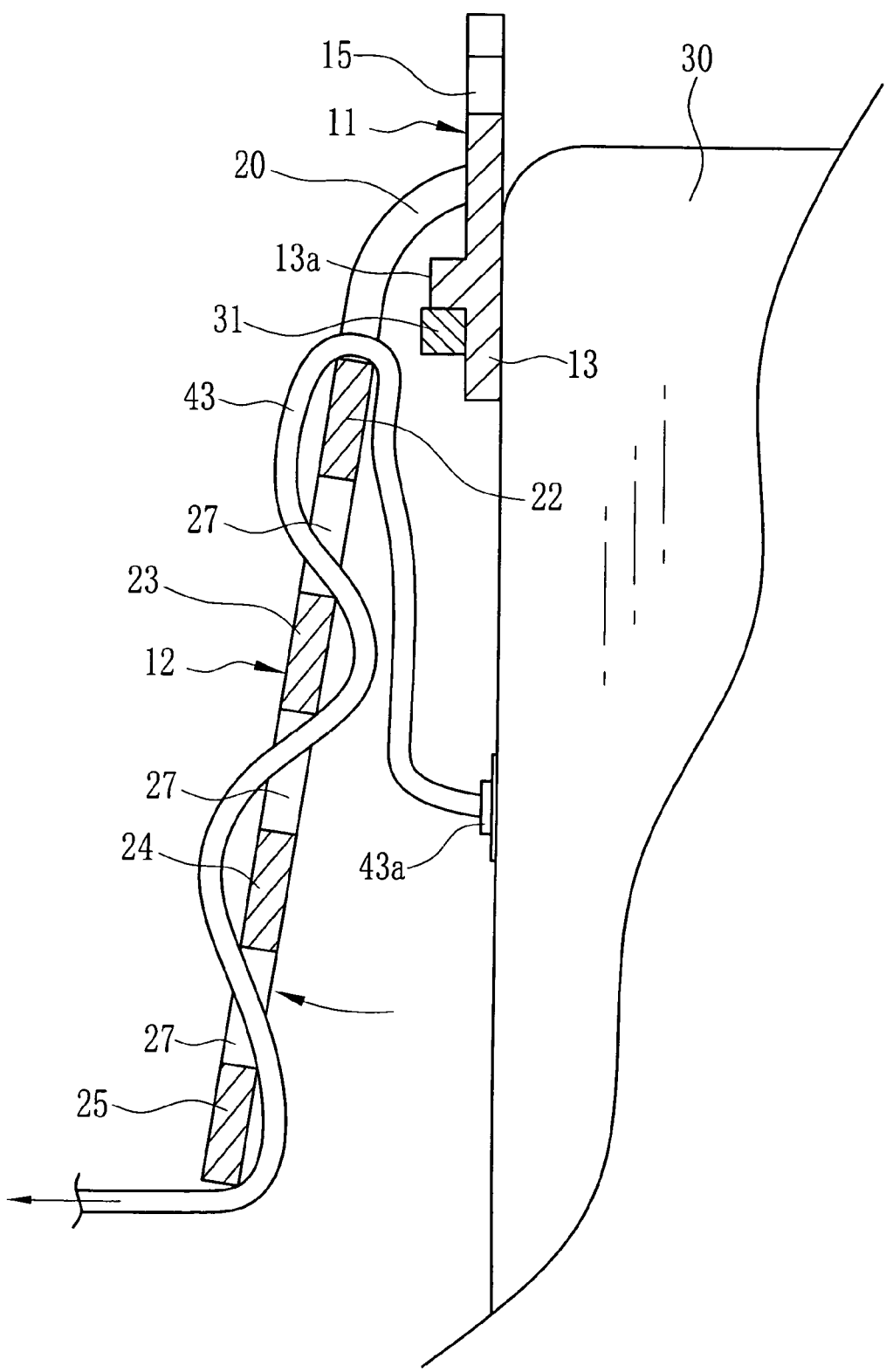
FIG. 4 is a cross-sectional view of the cable holder attached to the digital camera.

As shown in FIG. 4, friction is generated between the supporting projections 22 to 25 and the communication cable 43 winding around them and prevents the communication cable 43 from slipping off. Accordingly, even if a pulling force is applied to the communication cable 43, the pulling force does not reach the connection terminal 43a, for the supporting projections 22 to 25 tightly holding the communication cable 43. The connection terminal 43a is thus not pulled out of the data communication terminal 40. In addition, by elastically deforming, the arm portion 20 prevents the holder plate 12 from breaking when the communication cable 43 is pulled.

The stopper 13a on the projection 13 contacts the upper surface of the strap retainer 31. The attachment portion 11 is secured when the stopper 13a and the claws 14 vertically nips the strap retainer 31 therebetween. Having the stopper 13a, it is possible to form the claws 14 longer to easily bend when attaching/detaching the attachment portion 11 to/from the strap retainer 31.

Figure 5:
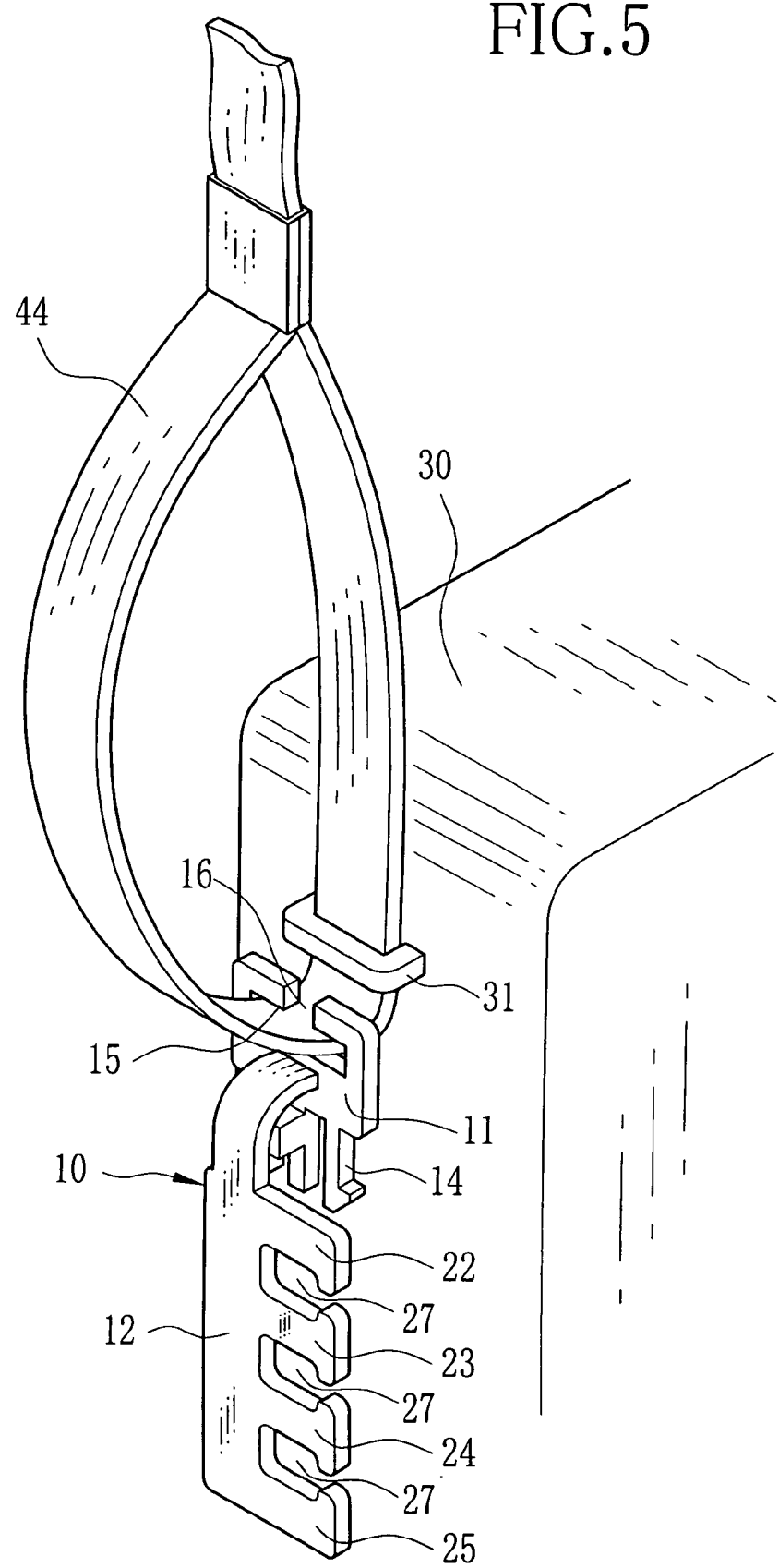
FIG. 5 is a magnified side view of the digital camera with the cable holder connected to a strap.

FIG. 5 shows a state in which the cable holder 10 is attached to a strap 44 which is in the form of a belt. The strap 44 is attached to the strap retainer 31. The strap 44 is inserted into the strap hole 15 to carry the cable holder 10. Accordingly, the width of the strap insert opening 16 is wider than the thickness of the strap 44 and narrower than the width of the strap 44. The width of the strap hole 15 is wider than the width of the strap 44, and the height of the strap hole 15 is higher than the thickness of the strap 44.

Figure 6:
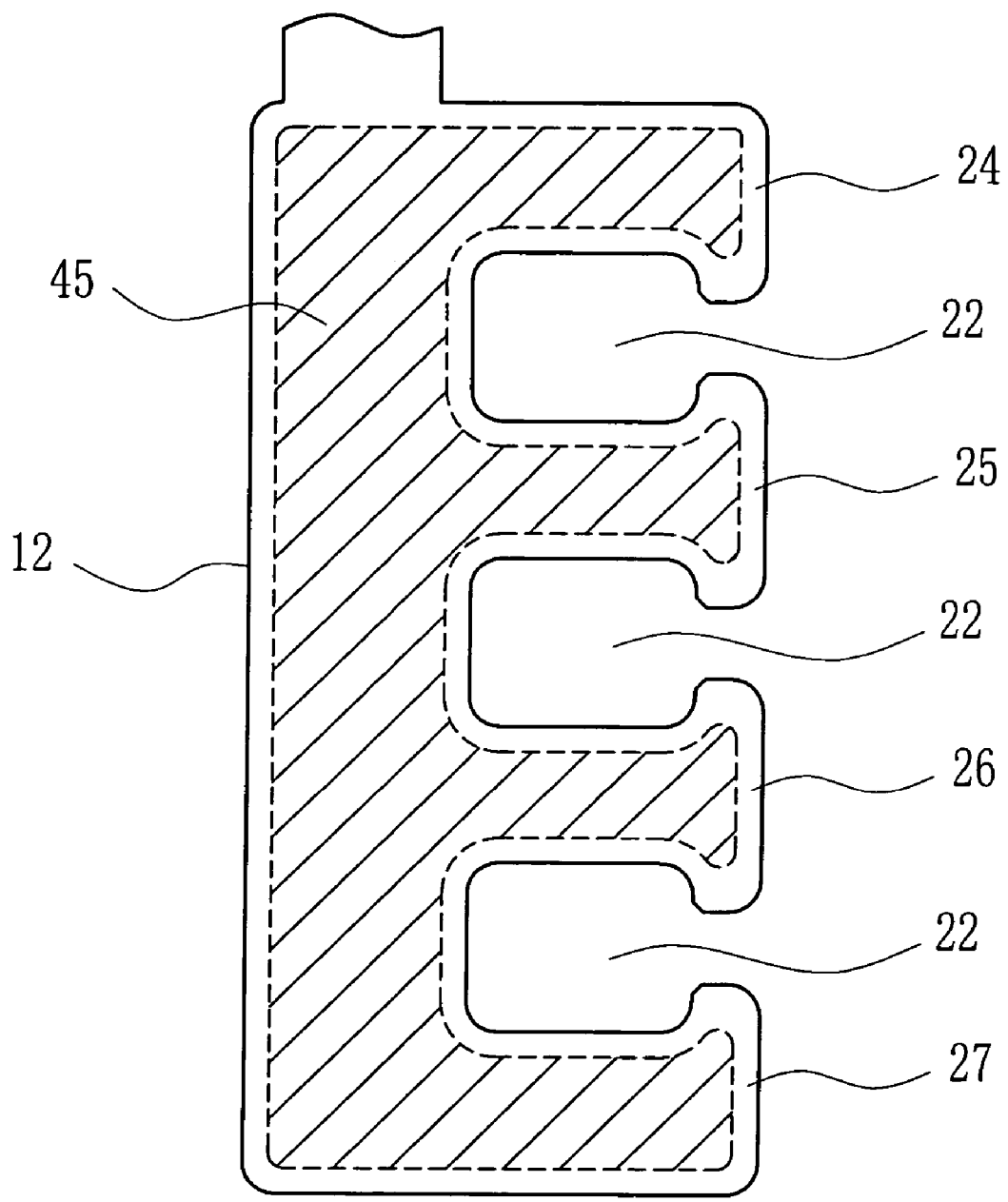
FIG. 6 is an explanatory view showing an attachment state of an electric wave absorbing member.

As shown in FIG. 6, an electric wave absorber 45 is embedded in the holder plate portion 12. The electric wave absorber 45 is, for example, a ferrite core. Other than being embedded, the electric wave absorber 45 can also be accommodated in the holder plate portion 12 which is constituted with two cases jointed together. Note that the electric wave absorber 45 can be a flexible sheet of rubber type electric wave absorber to be adhered on the surface of the holder plate portion 12. The electric wave absorber 45 prevents electromagnetic wave radiated from one cable from being transmitted to the other cable as a noise to a signal when a plurality of cables are wound about the holder plate portion 12.

Figure 7:
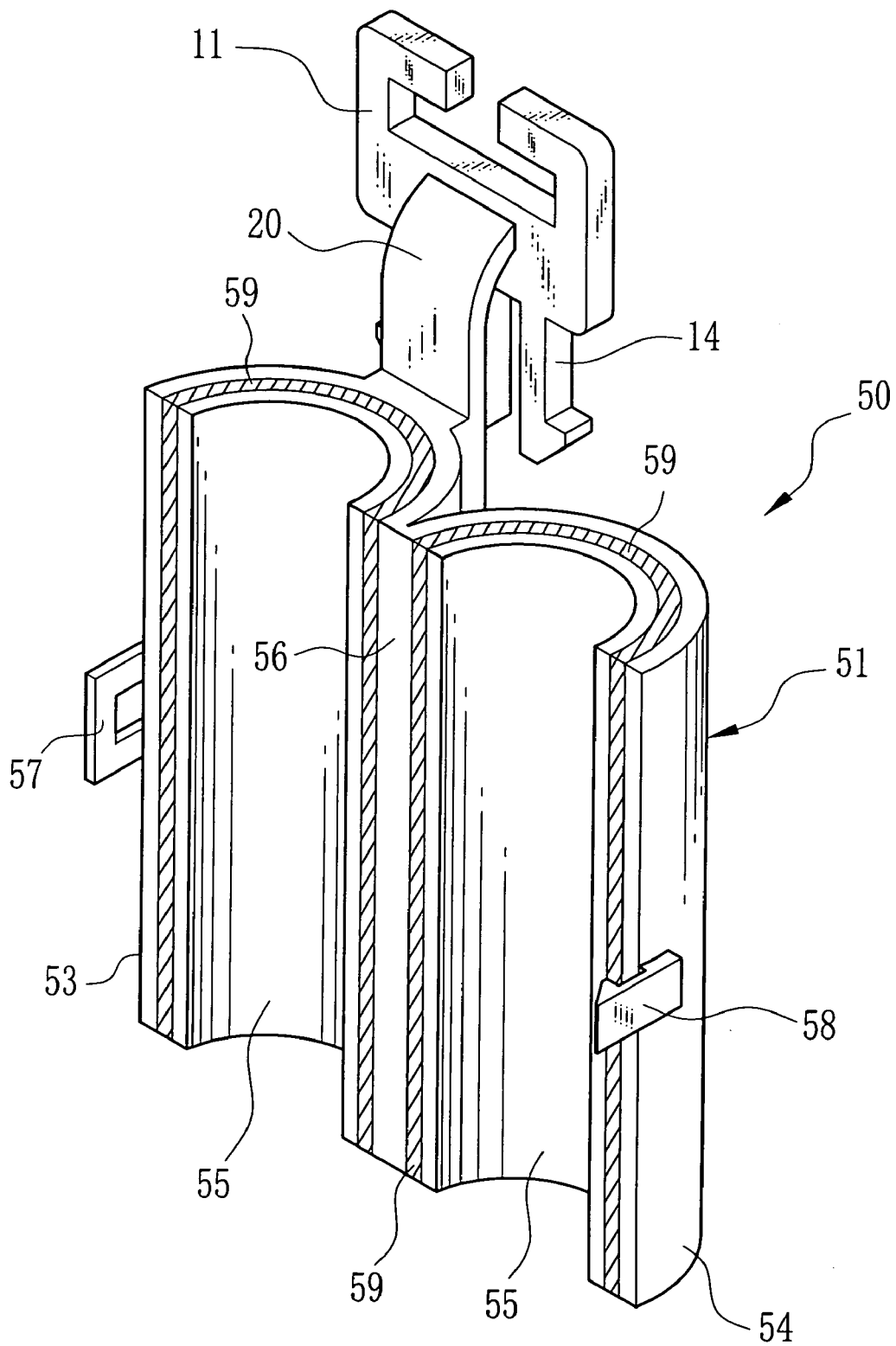
FIG. 7 is a perspective view of a cable holder of the second embodiment of the present invention.

The following is a second embodiment of the present invention shown in FIG. 7. Note that the components identical with those of the above-described embodiment are denoted by the same reference numerals, and descriptions thereof are abbreviated. A cable holder 50 is provided with the attachment portion 11 and a cylindrical holder portion 51 that are integrally formed. The cylindrical holder portion 51 comprises semicylindrical sleeve halves 53 and 54. Each sleeve half 53 and 54 has a semicircular hollow 55 for accommodating the cable. The sleeve halves 53 and 54 are connected together with a thin hinge portion 56, and tightly hold the cable within the semicircular hollow 55 when they are closed. The sleeve halves 53 and 54 are provided with a retainer 57 and a hook 58 for keeping the sleeve halves 53 and 54 closed as securely holding the cable. An electric wave absorber 59 is embedded in the sleeve halves 53 and 54 to shield the electromagnetic wave generated from the cable held within them.

Figure 8:
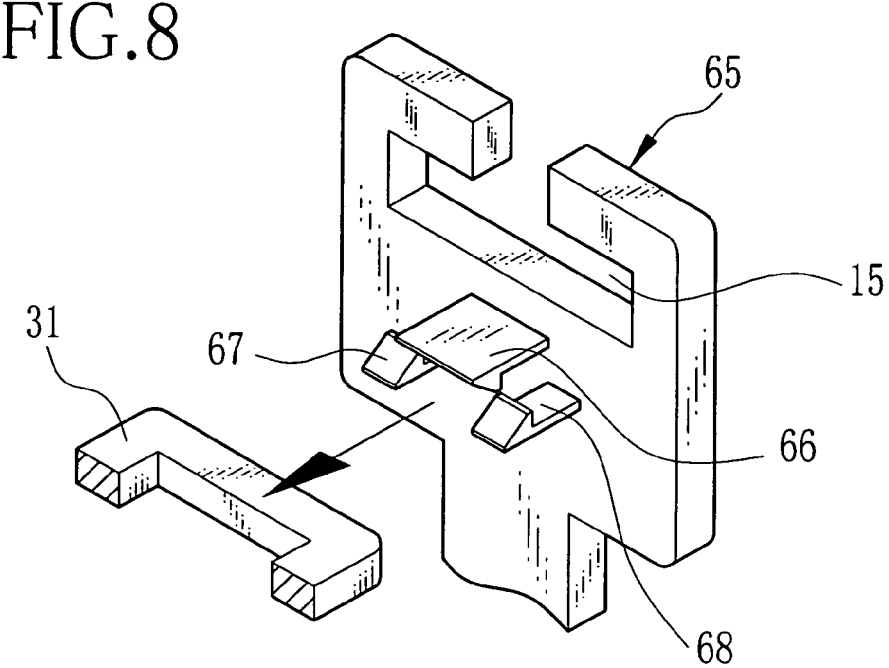
FIG. 8 is a perspective view of another example of an attachment portion.
Figure 9:
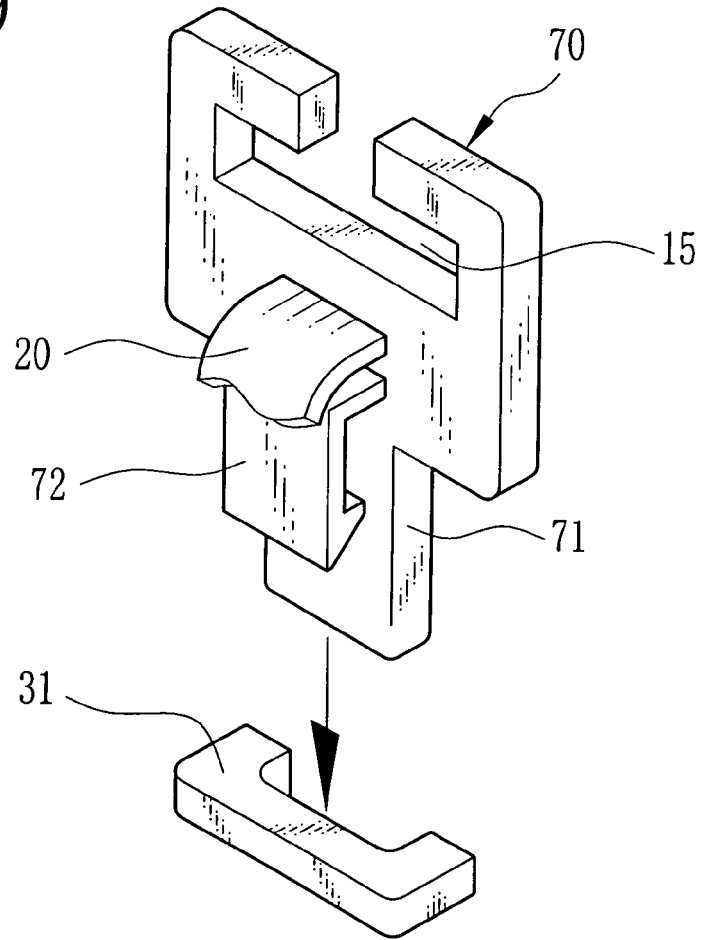
FIG. 9 is a perspective view of still another example of the attachment portion.

Note that the attachment portion of the present invention can take other forms than the one to insert the claws 14 into the strap retainer 31 and engage with the strap retainer 31 from the inside thereof, as shown in FIG. 1 to FIG. 5. For example, as shown in FIG. 8, an attachment portion 65 for engaging with the strap retainer 31 from the outside thereof is also applicable. The attachment portion 65 has a claw 66 for engaging with the upper portion of the strap retainer 31 and two claws 67 and 68 for engaging with the lower portion of the strap retainer 31, and is attached as the claws 66 to 68 together grab the strap retainer 31 from the front side thereof. It is also possible to use an attachment portion 70 having a fixing projection 71 to fit in the strap retainer 31 and a claw 72 formed parallel to an inserting direction of the fixing projection 71. The holder plate portion 12 does not sway, since the attachment portion 70 is securely attached to the strap retainer 31 when the claw 72 engages with the strap retainer 31 as the fixing projection 71 is inserted into the strap retainer 31. Note that the attachment portions in FIG. 8 and FIG. 9 is applicable to the cylindrical holder portion of FIG. 7.

Figure 10:
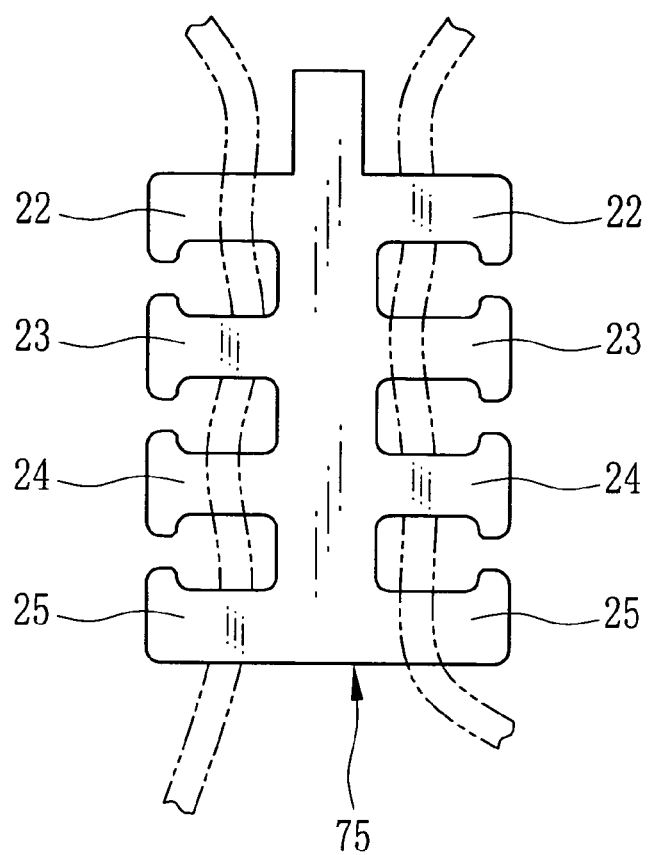
FIG. 10 is a front view of another example of a holder plate portion.
Figure 11:
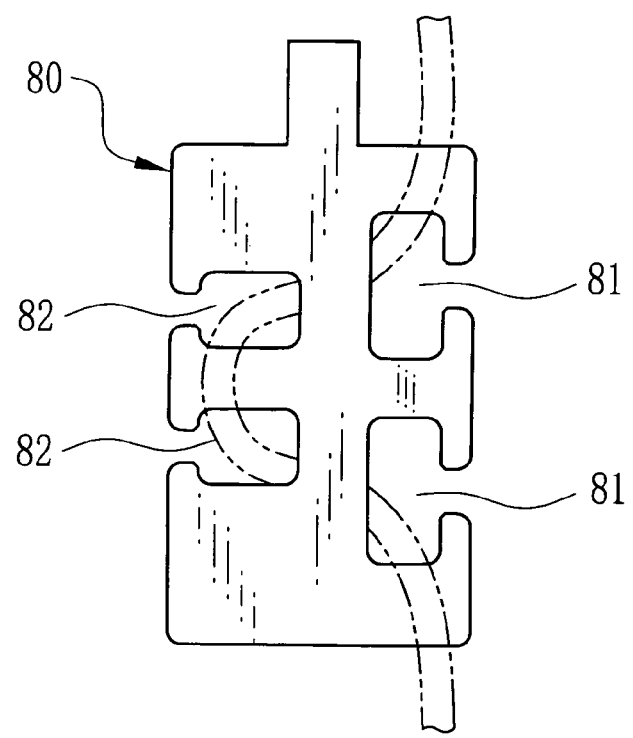
FIG. 11 is a front view of still another example of the holder plate portion.
Figure 12:
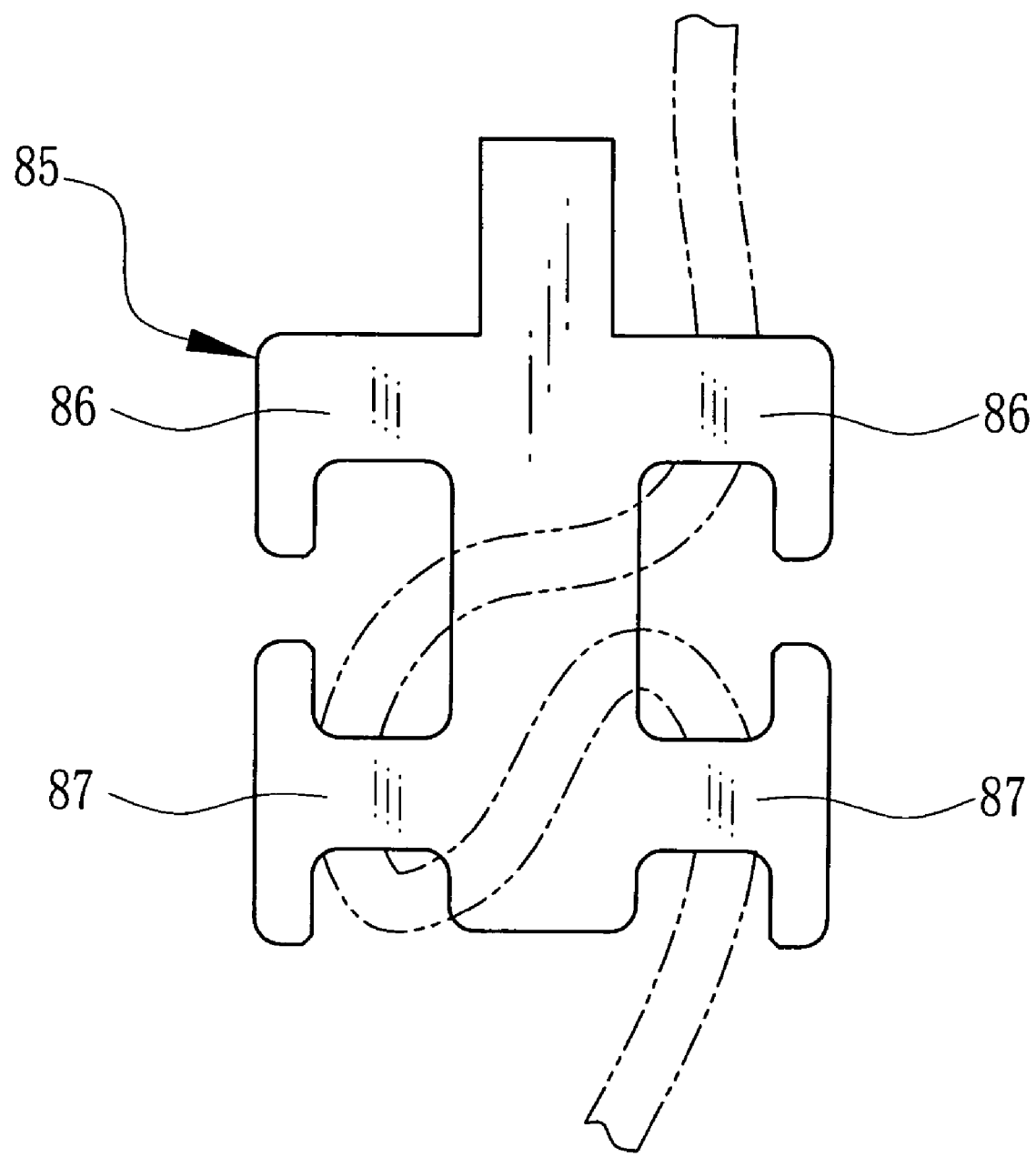
FIG. 12 is a front view of still another example of the holder plate portion.

The holder plate portion of the present invention is not limited in the holder plate portion 12, which is in an approximately rectangle shape and provided with the supporting projections 22 to 25 along one side thereof. For example, as shown in FIG. 10, a holder plate 75 having the supporting projections 22 to 25 on both sides thereof to hold more cables is also applicable. In addition, it is also possible to support the cable in a V-shape with a large cable hole 81 and a small cable hole 82, as a holder plate portion 80 shown in FIG. 11. Furthermore, as shown in FIG. 12, a holder plate portion 85 is also applicable that supports the cable in an S-shape with supporting projections 86 and 87. The holder plate portion 85 realizes downsizing thereof, as having less supporting projections.

Figure 13:
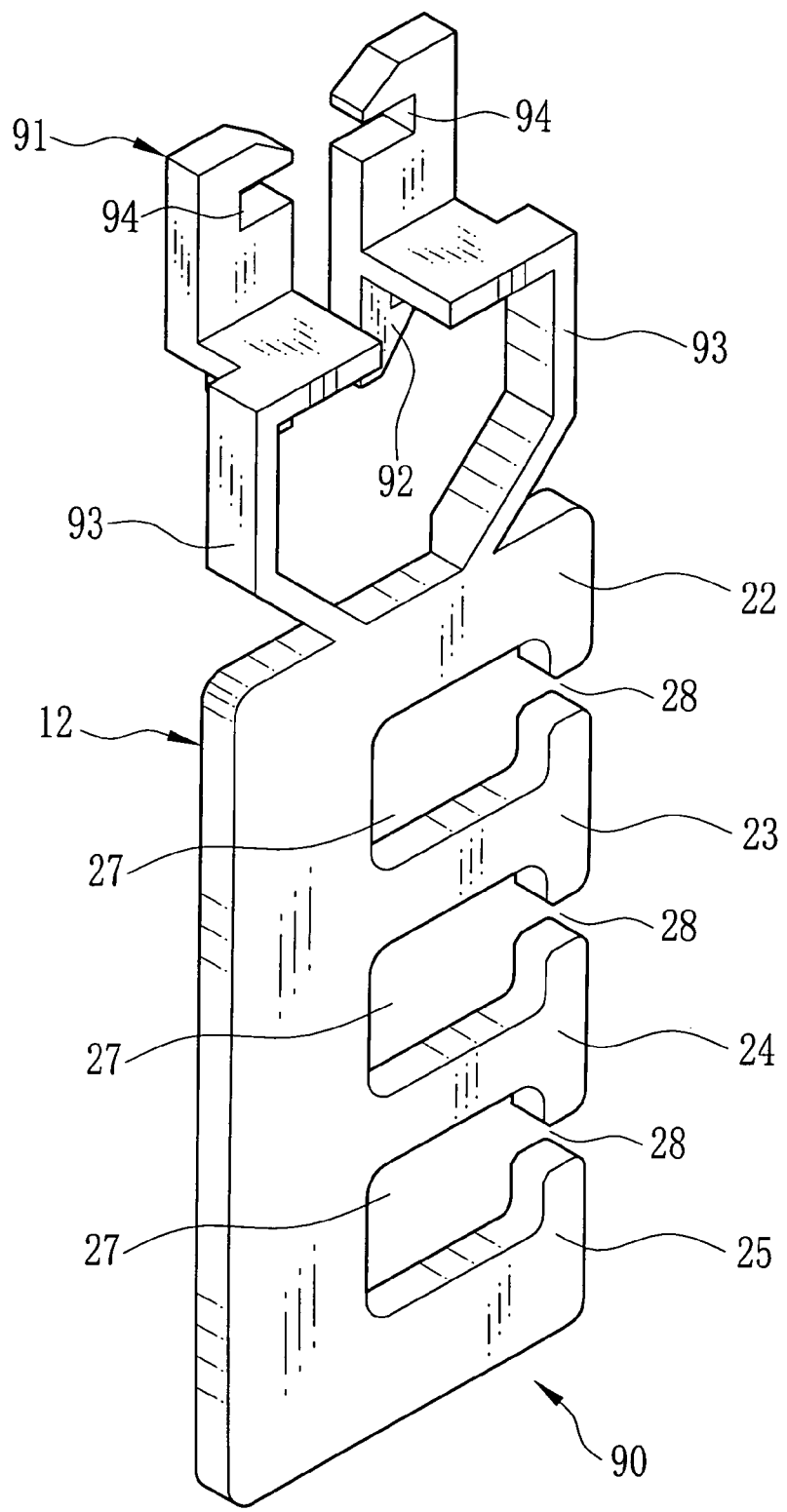
FIG. 13 is a perspective view of a cable holder of the third embodiment of the present invention.

As shown in FIG. 13, a cable holder 90 comprises an attachment portion 91 and the holder plate portion 12. The attachment portion 91 is provided with a pair of claws 92 for engaging with the strap retainer 31, and a pair of arms 93 protruding from the top of the holder plate portion 12. Each claw 92 is connected to the holder plate 12 via an arm portion 93. A pair of cut-out 94 is formed to face each other at the upper portion of the attachment portion 91 to allow the strap 44. Each arm portion 93 extends obliquely upward from the top face of the holder plate portion 12 toward the outside and then bends to be parallel to one another, so as to facilitate the user's operation to nip the elastic arms 93.

Figure 14A:
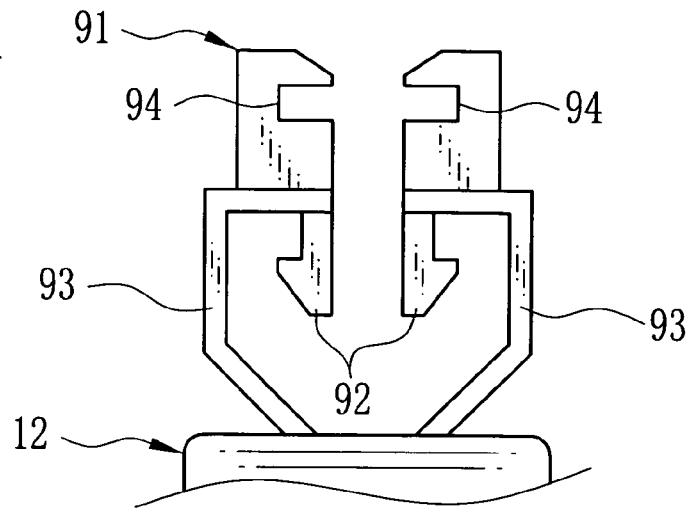
FIG. 14A to FIG. 14C are front views showing states of displaced claws by pressure on an elastic arm.
Figure 14B:
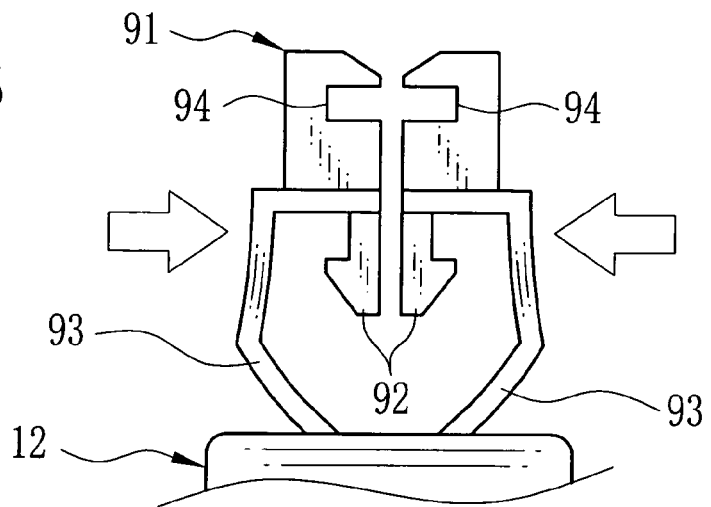
Figure 14C:
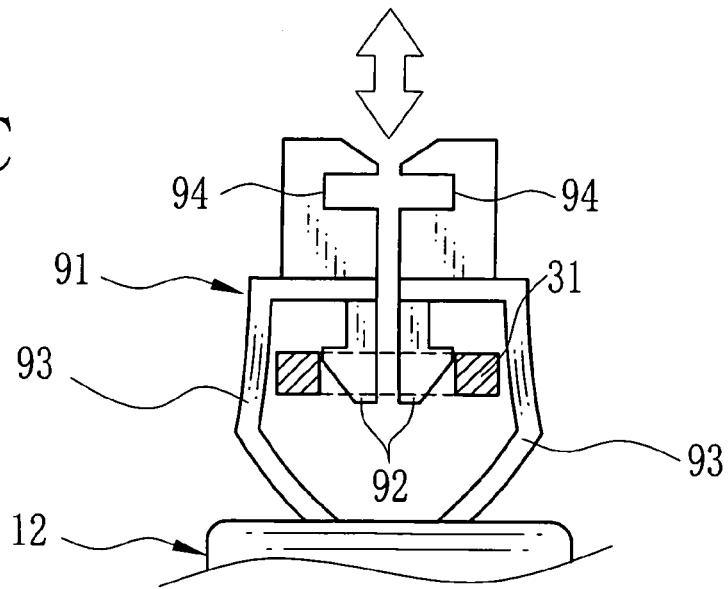

As shown in FIG. 14A, the claws 92 are normally separated from each other for a predetermined distance. When the arm portion 93 is pushed in attachment/detachment of the cable holder 90, the claws 92 are displaced to come close to each other because of the elastic deformation of the arm portion 93, as shown in FIG. 14B. When space between the claws 94 is reduced by the displacement of the claws 92 as shown in FIG. 14C, the attachment portion 91 can be attached to/detached from the strap retainer 31. Since it is not necessary for the user to directly nip the claws 92 with fingers, it is easy to attach/detach the attachment portion 91.

Note that it is preferred that the size of the cable hole can be adjusted in accordance with the number and the material (flexibility) of the cable to be supported. This is realized by, for example, composing the holder plate portion of two slidable plates and extending the supporting projections 22 to 25. In addition, the holder plate portion can be in the shape of not only a flat plate but also a curved plate to match the exterior shape of the portable device. It is also possible to arrange such that a plurality of holder plate portions can be connected to one another for changing the number of the cable hole when necessary. Furthermore, it is possible to integrally form the arm portion and the holder plate portion 12 out of a metal plate, while forming the attachment portion 11 out of plastic. When the attachment portion 11 is molded, the metal plate is embedded therein.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A cable holder comprising:
an attachment portion capable of being attached to a strap retainer of a portable device;
a cable supporting portion for supporting a part of a cable connected to said portable device; and
a connecting portion for connecting said cable supporting portion to said attachment portion,
wherein said connecting portion is an arm portion having a bent shape with one end protruding approximately vertically from the attachment portion,
wherein said bent shape of said arm portion also has an other end parallel to said cable supporting portion,
wherein said attachment portion, said cable supporting portion and said connecting portion are formed of plastic and integrally molded.

2. A cable holder defined in claim 1, wherein said arm portion is a flexible arm portion.

3. A cable holder defined in claim 2, wherein said cable supporting portion is a holder plate portion having a plurality of supporting projections, said supporting projections are arranged in line to form a cable hole between each two contiguous supporting projections.

4. A cable holder defined in claim 3, wherein an end of each supporting projection is formed to stretch in the width direction thereof, for preventing said cable from slipping off from said cable hole.

5. A cable holder defined in claim 4, wherein said plural supporting projections are provided on one side of said holder plate portion.

6. A cable holder defined in claim 4, wherein said plural supporting projections are provided on both sides of said holder plate portion.

7. A cable holder defined in claim 6, wherein said cable hole on one side of said holder plate portion is larger than said cable hole on the other side of said holder plate portion.

8. A cable holder defined in claim 2, wherein said attachment portion is provided with a pair of claws to be inserted into said strap retainer and engage with said strap retainer from inside thereof, said claws are capable of deforming elastically in a direction to come close to each other.

9. A cable holder defined in claim 8, wherein said attachment portion is further provided with a projection between said pair of claws for limiting the elastic deformation of said claws.

10. A cable holder comprising:
an attachment portion capable of being attached to a strap retainer of a portable device;
a cable supporting portion for supporting a part of a cable connected to said portable device; and
a connecting portion for connecting said cable supporting portion to said attachment portion,
wherein said connecting portion is an arm portion having a bent shape with one end protruding approximately vertically from the attachment portion, and
wherein said attachment portion has a strap hole for inserting a strap connected to said strap retainer.

11. A cable holder defined in claim 10, wherein said cable supporting portion is provided with an electric wave absorbing member.

12. A cable holder defined in claim 11, wherein said electric wave absorbing member is embedded in said cable supporting portion.

13. A cable holder comprising:
an attachment portion capable of being attached to a strap retainer of a portable device;
a cable supporting portion for supporting a part of a cable connected to said portable device; and
a connecting portion for connecting said cable supporting portion to said attachment portion,
wherein said connecting portion is an arm portion having a bent shape with one end protruding approximately vertically from the attachment portion,
wherein said bent shape of said arm portion also has an other end parallel to said cable supporting portion,
wherein said attachment portion includes a pair of claws to be inserted into said strap retainer and engage with said strap retainer from the inside thereof, and
wherein said connecting portion is a pair of arm portions for connecting each of said claws to said cable supporting portion, and capable of deforming elastically to move said pair of claws closer to each other.

14. A cable holder comprising:
an attachment portion capable of being attached to a strap retainer of a portable device;
a cable supporting portion for supporting a part of a cable connected to said portable device; and
a connecting portion for connecting said cable supporting portion to said attachment portion,
wherein said arm portion is a flexible arm portion,
wherein said attachment portion has a strap hole for inserting a strap connected to said strap retainer, and
wherein said cable supporting portion is provided with an electric wave absorbing member.

15. A cable holder defined in claim 14, wherein said electric wave absorbing member is embedded in said cable supporting portion.

16. A cable holder comprising:
an attachment portion capable of being attached to a strap retainer of a portable device;
a cable supporting portion for supporting a part of a cable connected to said portable device; and
a connecting portion for connecting said cable supporting portion to said attachment portion,
wherein said arm portion is a flexible arm portion, and
wherein said attachment portion is provided with a pair of claws to be inserted into said strap retainer and engage with said strap retainer from inside thereof, said claws are capable of deforming elastically in a direction to come close to each other.

17. A cable holder defined in claim 16, wherein said attachment portion is further provided with a projection between said pair of claws for limiting the elastic deformation of said claws.

18. A cable holder comprising:
an attachment portion capable of being attached to a strap retainer of a portable device;
a cable supporting portion for supporting a part of a cable connected to said portable device; and
a connecting portion for connecting said cable supporting portion to said attachment portion,
wherein said attachment portion includes a pair of claws to be inserted into said strap retainer and engage with said strap retainer from the inside thereof, and
wherein said connecting portion is a pair of arm portions for connecting each of said claws to said cable supporting portion, and capable of deforming elastically to move said pair of claws closer to each other.

* * * * *